(12) United States Patent
Freeman et al.

(10) Patent No.: US 7,305,277 B2
(45) Date of Patent: Dec. 4, 2007

(54) METHODS AND SYSTEMS FOR POSITION SENSING OF COMPONENTS IN A MANUFACTURING OPERATION

(75) Inventors: Philip L. Freeman, Maryland Heights, MO (US); John R. Dworschak, Wildwood, MO (US); Joseph C. Marsh, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/096,612

(22) Filed: Mar. 31, 2005

(65) Prior Publication Data

US 2006/0224268 A1    Oct. 5, 2006

(51) Int. Cl.
*G06F 19/00* (2006.01)
*G05B 19/18* (2006.01)

(52) U.S. Cl. .................... 700/114; 700/57; 700/59; 700/192; 700/193

(58) Field of Classification Search ................ 700/57, 700/59, 114, 192, 193
See application file for complete search history.

(56) References Cited

U.S. PATENT DOCUMENTS

| | | | |
|---|---|---|---|
| 4,441,809 A | 4/1984 | Dudley et al. | |
| 4,796,198 A | 1/1989 | Boultinghouse et al. | |
| 4,820,041 A | 4/1989 | Davidson et al. | |
| 5,100,229 A | 3/1992 | Lundberg et al. | |
| 5,110,202 A | 5/1992 | Dornbusch et al. | |
| 5,294,970 A | 3/1994 | Dornbusch et al. | |
| 5,309,212 A | 5/1994 | Clark | |
| 5,579,102 A | 11/1996 | Pratt et al. | |
| 6,381,006 B1 | 4/2002 | Ramstrom | |
| 6,400,452 B1 | 6/2002 | Maynard | |
| 6,437,860 B1 | 8/2002 | Jappinen | |
| 6,452,668 B1 | 9/2002 | Pratt | |
| 6,501,543 B2 | 12/2002 | Hedges et al. | |
| 6,519,029 B1 | 2/2003 | Hedges et al. | |
| 6,535,282 B2 | 3/2003 | Hedges et al. | |
| 6,545,751 B2 | 4/2003 | Beliveau et al. | |
| 6,618,133 B2 | 9/2003 | Hedges et al. | |
| 6,621,565 B2 | 9/2003 | Pratt et al. | |
| 6,630,993 B1 | 10/2003 | Hedges et al. | |
| 6,662,103 B1 | 12/2003 | Skolnick et al. | |
| 2005/0082262 A1* | 4/2005 | Rueb et al. ............... 219/121.6 |
| 2005/0172470 A1* | 8/2005 | Cobb et al. ................. 29/407.1 |

* cited by examiner

*Primary Examiner*—Ryan A Jarrett
(74) *Attorney, Agent, or Firm*—Lee & Hayes, PLLC

(57) ABSTRACT

Methods and systems for position sensing are disclosed. In one embodiment, a method includes measuring at least three discrete point positions associated with a first component by using at least one transmitter having a known position and orientation and in a line of sight with the three discrete point positions, the three discrete point positions having known distances relative to one another. The method computes a current position and orientation of the first component using data provided by the at least one transmitter and the three discrete point positions, along with position and orientation data from a last known location of the first component assuming that no sudden position changes since the first component has moved from the last known location. The first and second components may be a workpiece and a tool that performs a manufacturing operation on the workpiece.

14 Claims, 6 Drawing Sheets

$-180 < \theta \leq 180$ $-90 \leq \phi \leq 90$ $\theta$ = ANGLE OF AZIMUTH (DEFINED IN X-Y PLANE)

$\phi$ = ANGLE OF ALTITUDE (DEFINED FROM X-Y PLANE)

METHODS AND SYSTEMS FOR POSITION SENSING OF COMPONENTS IN A MANUFACTURING OPERATION

FIELD OF THE INVENTION

The present disclosure relates to methods and systems for performing position measurements during manufacturing operations.

BACKGROUND OF THE INVENTION

During manufacturing operations, it may be desirable to actively monitor and adjust a position of a tool that performs manufacturing operations on a component in order to ensure the accuracy of the manufacturing operation. Similarly, during the assembly of two components, it may be desirable to actively monitor the positions of the components to ensure an accurate fit. For example, aircraft components may be assembled in relatively expansive manufacturing areas. To achieve a precise fit of the components being assembled, the positions of the tools that perform operations on the components, as well as the locations of the components, may be monitored using position monitoring systems. As tools and components are moved relative to one another, reference points associated with the tools and components may be measured and monitored. The position data may then be used to adjust the relative position of the tools and components until they are in the correct locations. Once this is achieved, the manufacturing operations may be more accurately performed, which may result in a more accurate assembly.

Current positioning systems include infrared global positioning system (IRGPS) technology which is analogous to the system of satellites making up the commonly known Global Positioning System (GPS). While GPS uses satellites orbiting the earth to determine positioning information, IRGPS employs infrared laser transmitters emitting infrared pulses from known, fixed positions throughout a relatively limited manufacturing area. These infrared pulses are received by photo receivers which may compute, for example, angle and position information based on the timing of the infrared pulses received. Existing IRGPS systems include, for example, those system currently available from ArcSecond, Inc. of Dulles, Va.

Although desirable results have been achieved using such prior art methods, there is room for improvement. For example, due to the curved nature of components, as well as congestion of the work space arising from lifts, cranes and other tools inherent in manufacturing, it can be difficult and expensive to place all of the required receivers on a component or a tool in the line of sight of at least two transmitters. Moreover, even when this requisite can be satisfied, the positioning system may still not provide optimal position and orientation data for the tool or the component.

SUMMARY OF THE INVENTION

The present invention is directed to methods and systems for position sensing during manufacturing operations. Embodiments of methods and systems in accordance with the present invention may advantageously increase position data fidelity while also providing orientation data. Moreover, embodiments of methods and systems in accordance with the present invention may also decrease the overall cost and complexity of gathering position and orientation data by decreasing the number of necessary fixed transmitters used by a positioning system.

In one embodiment, a method of performing a manufacturing operation includes measuring at least three discrete point positions associated with a first component by using at least one transmitter having a known location (e.g. position and orientation information) and in the line of sight with the at least three discrete point positions, the three discrete point positions having known distances relative to one another. It is assumed that no sudden position changes (e.g. flips) have occurred since the first component has moved from a last known location. With this assumption, a current position and orientation of the first component is computed using data provided by the at least one transmitter and the at least three discrete point positions, along with position and orientation data from the last known location.

In another embodiment, a method of performing a manufacturing operation using first and second components includes positioning the first component in a desired position adjacent the second component, measuring at least four discrete point positions associated with the first component by using at least one transmitter having a known position and orientation and in a line of sight with the at least four discrete point positions, the four discrete point positions having known distances relative to one another, and computing a current position and orientation of the first component using data provided by the at least one transmitter and the at least four discrete point positions.

BRIEF DESCRIPTION OF THE DRAWINGS

Preferred and alternate embodiments of the present invention are described in detail below with reference to the following drawings.

DETAILED DESCRIPTION

The present invention relates to methods and systems for performing position measurements during manufacturing operations. Many specific details of certain embodiments of the invention are set forth in the following description and in FIGS. 1-7 to provide a thorough understanding of such embodiments. One skilled in the art, however, will understand that the present invention may have additional embodiments, and that the present invention may be practiced without one or more of the details described in the following description.

Generally speaking, embodiments of methods and systems in accordance with the present invention may advantageously increase position data fidelity during manufacturing operations. Moreover, embodiments of methods and systems in accordance with the present invention may decrease the overall cost and complexity of gathering position data by decreasing the number of necessary fixed transmitters used by a positioning system.

In one embodiment, a manufacturing operation in accordance with the invention includes the measurement of the positions of a plurality of discrete points (i.e., at least three points) on a first component using a measurement system incorporating sensors at each point, each sensor being a known distance from the other sensors. The first component may be a rigid component. A single transmitter at a known location remote from the first component, and in the line of site with the at least three sensors, may then be used with the sensors to collect data from which the position of the first component may be computed. In addition, either simultaneously or sequentially, similar position for a second component may be collected. The second component may be a tool that performs a manufacturing operation on the first component, or a part that is to be attached to the first component, or any other desired device. The computed position and orientation data for either or both components may then be compared with a model or reference that includes a desired or "as-designed" position of the components relative to one another, and suitable adjustments of at least one of the first and second components can be made. In a particular embodiment, the first and second components may be portions of an aircraft that are being assembled, and the desired position of the components may be provided by a three-dimensional Computer Aided Design (CAD) model of the aircraft. Alternately, the first component may be a workpiece and the second component may be a tool that performs a manufacturing operation on the workpiece.

Figure 1:
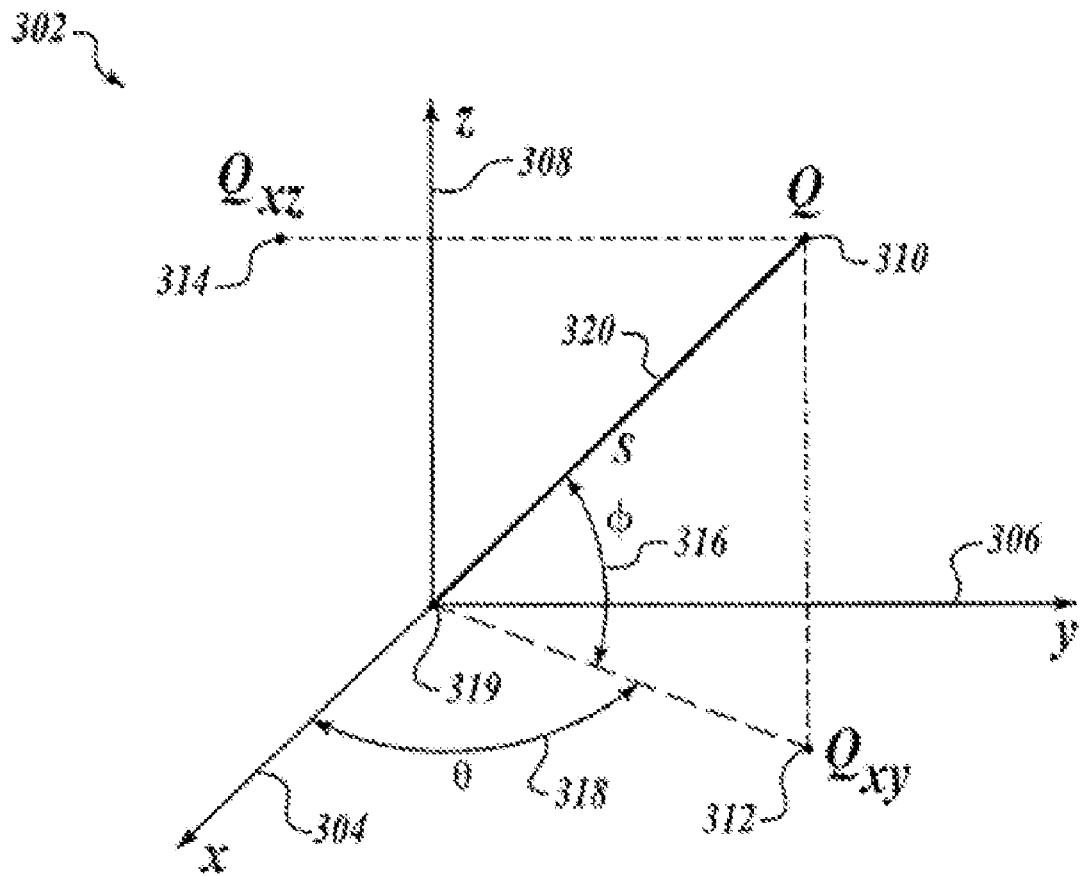
FIG. 1 is an isometric view of three orthogonal coordinate axes used to locate points in three space in accordance with an embodiment of the invention.

Turning to FIG. 1, a three dimensional coordinate system 302 comprising three orthogonal axes, an x-axis 304, a y-axis 306, and a z-axis 308 is shown. Using these axes, a point Q 310 can be located precisely by its corresponding x, y and z coordinates. These coordinates can also be used to locate a point of superposition of point Q 310 on the plane formed by the x-axis 304 and the y-axis 306 (i.e. point Qxy 312). The coordinates of point Qxy 312 are the x and y coordinates of point Q 310, with the z coordinate of point Qxy 312 being zero. Similarly, the coordinates of point Q 310 can also be used to find a point of superposition of point Q 310 on the plane formed by the x-axis 304 and the z-axis 308 (i.e. point Qxz 314). The coordinates of point Qxz 314 are the x and z coordinates of point Q 310, with the y coordinate of point Qxz 314 being zero.

As further shown in FIG. 1, angle $\Phi$ 316 represents the angle between the xy plane and the line connecting the origin O 319 to the point Q 310. Angle $\Phi$ 316 Angle $\Phi$ 316 is positive when Q has a positive z component and negative when Q has a negative z component. Correspondingly, angle $\theta$ 318 represents the angle between the x-axis 304 and a line running through the origin O 319 and point Qxy 312. In addition to its x, y and z coordinates, the position of point Q 310 in three-dimensional space can also be determined using the distance S 320 of point Q 310 from the origin O 319 along with the positioning angles $\Phi$ 316 and $\theta$ 318.

Next, a description of a method to detect the position and orientation of a component 111 (see FIG. 6) to which an arbitrary number of sensors 116 is attached, and to which the sensors 116 are in the line of sight of an arbitrary number of transmitters 112 will be explained. The component 111 may be a rigid component. Alternately, the component 111 may be approximately rigid such that any positional changes of the sensors 116 due to flexures, vibrations, or other non-rigid characteristics of the component 111 are less than the positional measurement uncertainty of the measurement system being used to detect the positions of the sensors, as described more fully below. For this derivation, it is assumed that all of the distances between the sensors 116 on the component 111 are known. It will be understood however, that in some embodiments, not all of the relative distances between all sensors 116 on a component 111 need be known. For example, in one embodiment a component 111 may have seven sensors 116, with the relative distances between only three being known. Alternately, in another embodiment the relative distances may be known for one group of three sensors 116 and for another group of four sensors 116. Thus, multiple such combinations can be created and still be well within the spirit of the current invention.

Turning back to the derivation, a number n of transmitters Ti 112 can be placed in a manufacturing facility 100 where i={1,2,3, ..., n}. The location of each transmitter 112 can then by found by measurement and placement means known in the art so that the position of each transmitter 112 is known as are the relative positions of each transmitter 112 to one another. In addition, m sensors Si 116 can be employed, where i={1,2,3, ..., m}. The transmitters Ti 112 can then be used in conjunction with the sensors Si 116 to determine the angular location (i.e. the positioning angles $\Phi$ 316 and $\theta$ 318) of a sensor 116 relative to each transmitter Ti 112 in the line of sight of the sensor 116.

$$(\theta,\phi)_i^j \to S_i, \text{ for each } T_j \text{ observable by } S_i$$

This represents a line in space on which the sensor 116 lies.

Each sensor 116 has unique location in space $$P_i = \begin{bmatrix} x \\ y \\ z \end{bmatrix}.$$

$P_i^j$ represents the coordinates of a unique sensor 116 in three-dimensional space relative to a transmitter j 112, with $P_i^0$ representing the coordinates in space relative to a reference coordinate system T. $P_i^0$ and $P_i^j$ represent the same location in space, just relative to different coordinate systems.

The distance between two sensors 116 a and b can be represented as $$d_a^b = d_b^a = \overline{P_a P_b}$$

and is already known, since, as discussed above, the distances between sensors 116 on the same component 102, 104, 106, 108 are known. If a=b, and the sensors 116 are at the same location, or if sensor a 116 is also sensor b 116, then by definition $d_a^b = 0$.

The sensor 116 has an unknown location along the line $(\theta,\phi)_i^j$, which can be represented by $s_i^j$.

$$P_i^j = s_i^j \begin{bmatrix} \cos(\phi)\cos(\theta) \\ \cos(\phi)\sin(\theta) \\ \sin(\phi) \end{bmatrix}$$

Thus, by solving for all s, the position and orientation of the component 111 on which the sensors 116 are placed, can be determined. This determination can be made by transforming each of the $P_i^j$ onto the coordinate system T. Such transformation will be shown below using an example of the method of homogenous transform. However, those skilled in the art will also recognize that other forms of transformation, including affine transformation, may also be used.

Each transmitter 112 can be represented by a 4×4 matrix relative to the reference coordinate system T as $$A_j^0 = \begin{bmatrix} n_x & o_x & a_x & t_x \\ n_y & o_y & a_y & t_y \\ n_z & o_z & a_z & t_z \\ 0 & 0 & 0 & 1 \end{bmatrix}$$

with each sensor being represented in T as $$\begin{bmatrix} P_i^0 \\ 1 \end{bmatrix} = (A_j^0)^{-1} \begin{bmatrix} P_i^j \\ 1 \end{bmatrix}$$

This renders a $P_i^0$ with unknown s for each $(\theta,\phi)_i^j$. Since the distance between any two of the sensors is known (including the zero distance between multiple readings of the same sensor), n sensor readings will result in $$\frac{n^2-n}{2}$$

equations. The unknowns for each $P_i^0$ can thus be found by simultaneous solution of these equations.

In the event that the number of equations is greater than the number of unknown s, a best-fit solution can be obtained by using a maximum likelihood estimator such as total least squares. In such case, the equations should be normalized relative to the noise in each measurement including the angular uncertainty in the sensor 116 data, the distance uncertainty between sensors 116, and the transform uncertainty in each of the $A_j^0$.

Using this method, the position and orientation of the component 111 to which at least 4 sensors are attached at known distances to one another can be determined by using a single transmitter 112 in the line of sight with any one sensor 116. It will also be understood that in some instances, a number of the sensors 116, placed on a component 111 may be in the line of sight of several transmitters 112, while other sensors 116 on the component 111 are only in the line of sight of a single transmitter 112. For example, four sensors 116 on a wing 108 may be in the line of sight of two transmitters 112, while three other sensors 116 on the wing 108 may only be in the line of sight of one transmitter 112 each. By using the known relative distances between the sensors 116 as part of the solution, all of the sensors 116 may be included in the overall solution of the position and orientation of the wing 108. Such inclusion increases the accuracy and precision of the position and orientation data produced by the methods and systems of the present invention.

In another embodiment, the above-derived method can be employed to provide accurate position and orientation data for a component 111 when only three sensors 116 having known distances relative to one another are placed on the component 111 and are in the line of sight of at least one transmitter 112. In such an instance, the readings from the three sensors 116 will result in three possible solutions. Using historical information from a last known location in which the position and orientation of the component 111 was known, the correct solution for the current position and orientation of the component 111 can be ascertained from these three choices by assuming that no sudden positional changes (e.g. flips) of the component 111 have occurred. Thus, the one solution out of the three provided by the calculations detailed above which agrees with a logical extrapolation of the smooth movement of the component 111 from its last known location is assumed to be correct. Such an assumption can only be made when the movement of the component 111 can indeed be accurately extrapolated from its last known location.

For example, in embodiments that involve large-scale manufacturing, such an assumption is very often correct since large components 111 are typically moved slowly and deliberately, and thus incidents such as sudden positional changes typically do not occur. Moreover, successive position and orientation measurements of a component 111 are commonly conducted at short time intervals leaving no time for a sudden positional change or change in orientation or direction of motion of the component 111 to occur. In one particular embodiment, the assumption that there are no sudden positional changes is correct if there is no positional change greater than approximately twice the previous incremental positional change between successive sensor readings. In alternate embodiments, greater positional changes between successive sensor readings may be allowable.

Figure 2:
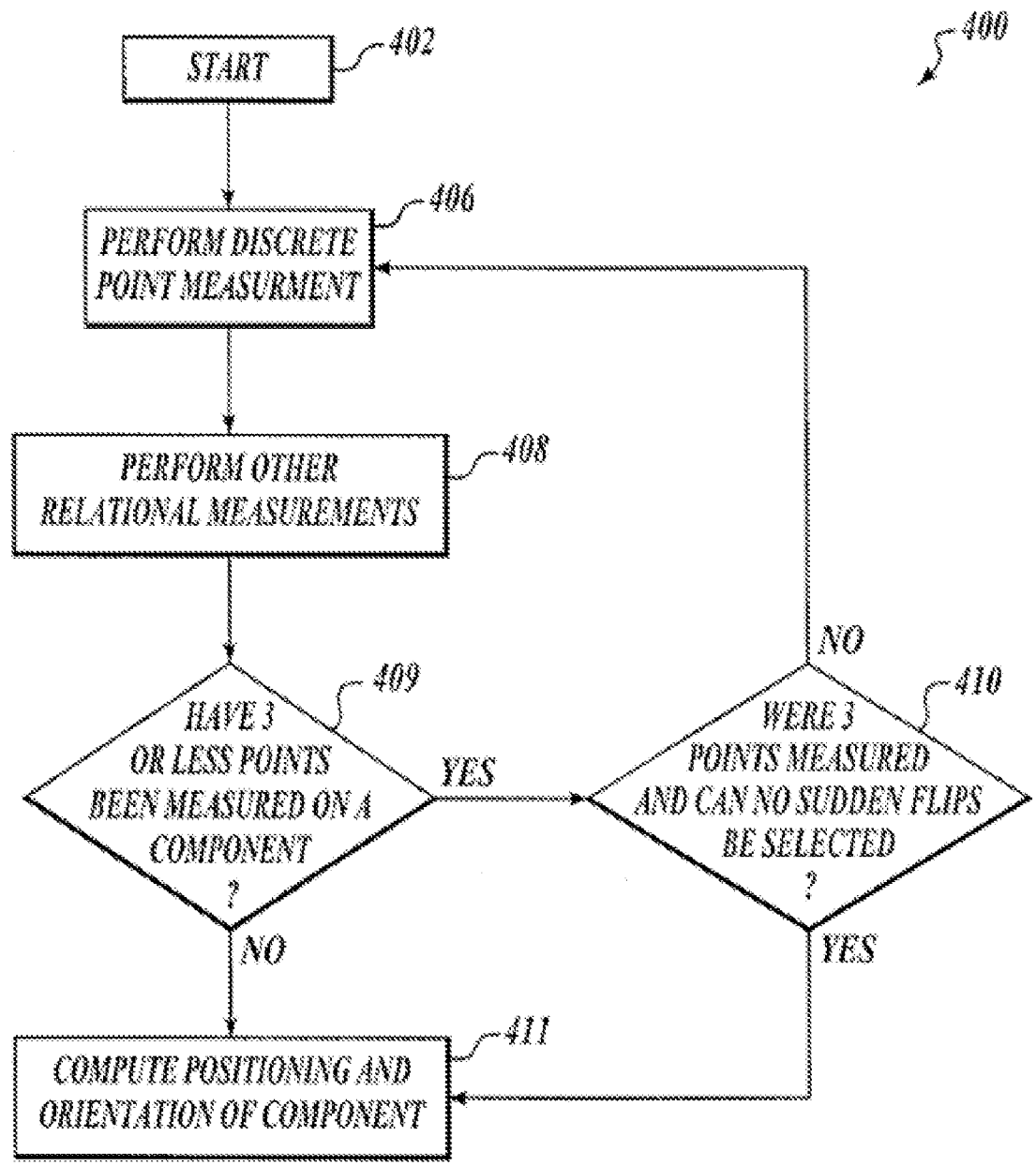
FIG. 2 is a flow chart of a method of performing a manufacturing operation in accordance with an embodiment of the invention.
Figure 6:
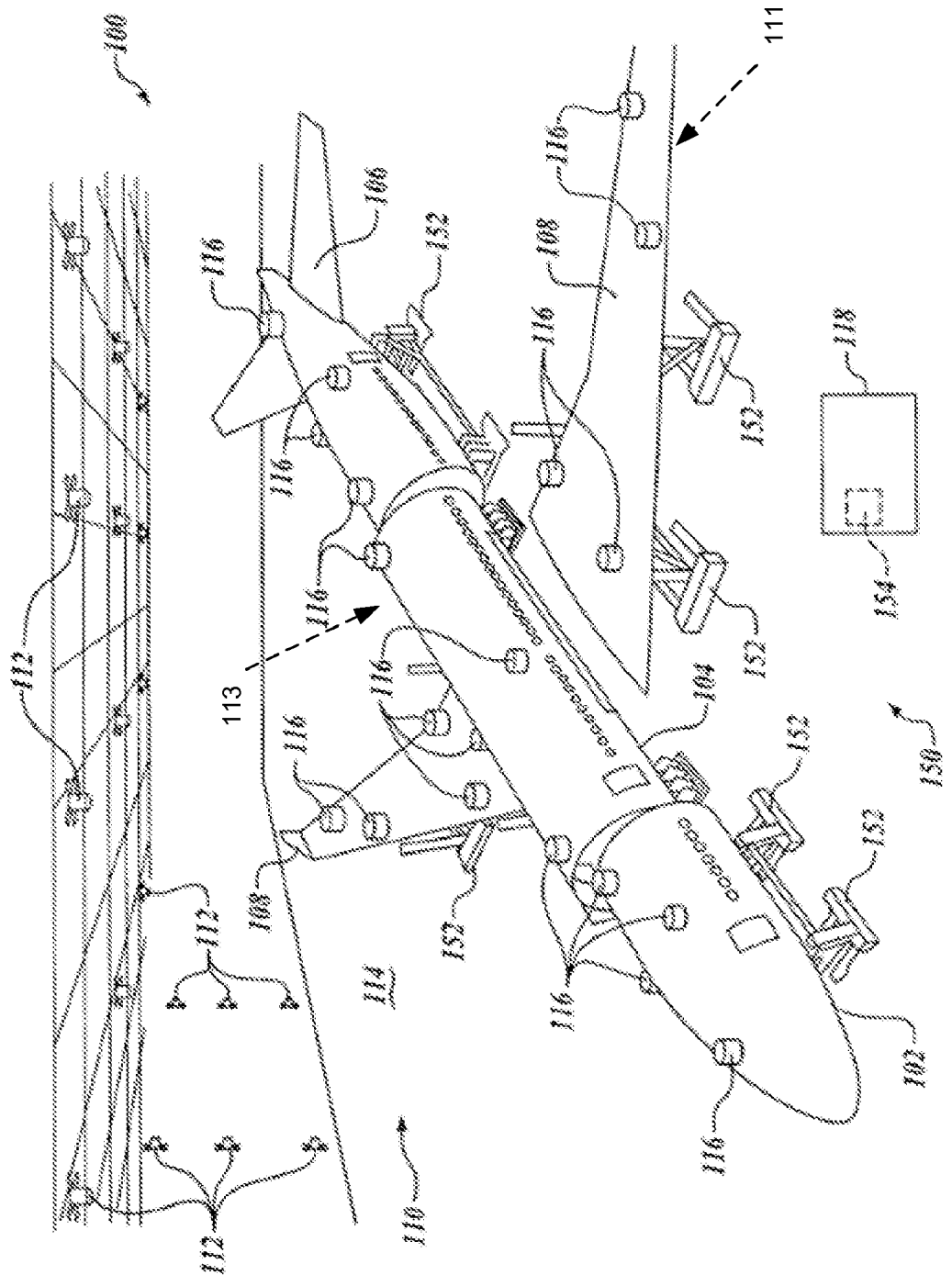
FIG. 6 is an isometric view of a plurality of disassembled aircraft components in a manufacturing facility in accordance with an embodiment of the present invention.

FIG. 2 is a flow chart showing a method 400 of performing a manufacturing operation involving a plurality of components in accordance with an embodiment of the invention comprising one transmitter and three or more sensors. The method 400 begins at a block 402. At a block 406, the position measurement system 110 is operated to perform measurements of the positions of at least three discrete points (or sensors 116 ) on at least one of the components 111 (i.e. a first component), and on another component 113 (i.e. a second component, as shown in FIG. 6) that may be proximate thereto. As discussed above, the relative distances between the at least three discrete points on each of the first and second components are known, and the measurement system uses at least one transmitter 112 at a known position and in the line of sight with the at least three discrete points. For example, the measurement system 110 may perform measurements on points (or sensors 116 ) on a wing assembly and a mid-fuselage assembly to which it is desired to be attached. Alternately, the first component may be a workpiece and the second component may be a tool that is adapted to perform a manufacturing operation on the workpiece. At a block 408, any other desired measurements, including measurements of gaps, edge margin, and other conventional types of measurements, may be performed. In general, the order of operation between blocks 406 and 408 is unimportant.

At a block 409, if only three discrete points or sensors 116 have been measured on either the first or second component, then the method moves to a block 410 where it is decided if no sudden positional changes (e.g. flips) can be selected. If so, the method then moves to a block 411 where the measured data, along with the known relative distances between sensors 116 and any no sudden positional change assumptions are used to compute the positions and orientations of the first and second components under investigation. If, however, the situation is one in which no assumption can be made that no sudden position changes can be selected, or if less than three discrete points were measured, then the data are insufficient to continue the method. In such a case, the method must be restarted at a block 406 when the assumption of no sudden position changes can be selected, or alternately, when at least four discrete points can be measured. Returning to block 409, if at least four discrete points have been measured then the method may skip block 410 and proceed directly to block 411.

Figure 3:
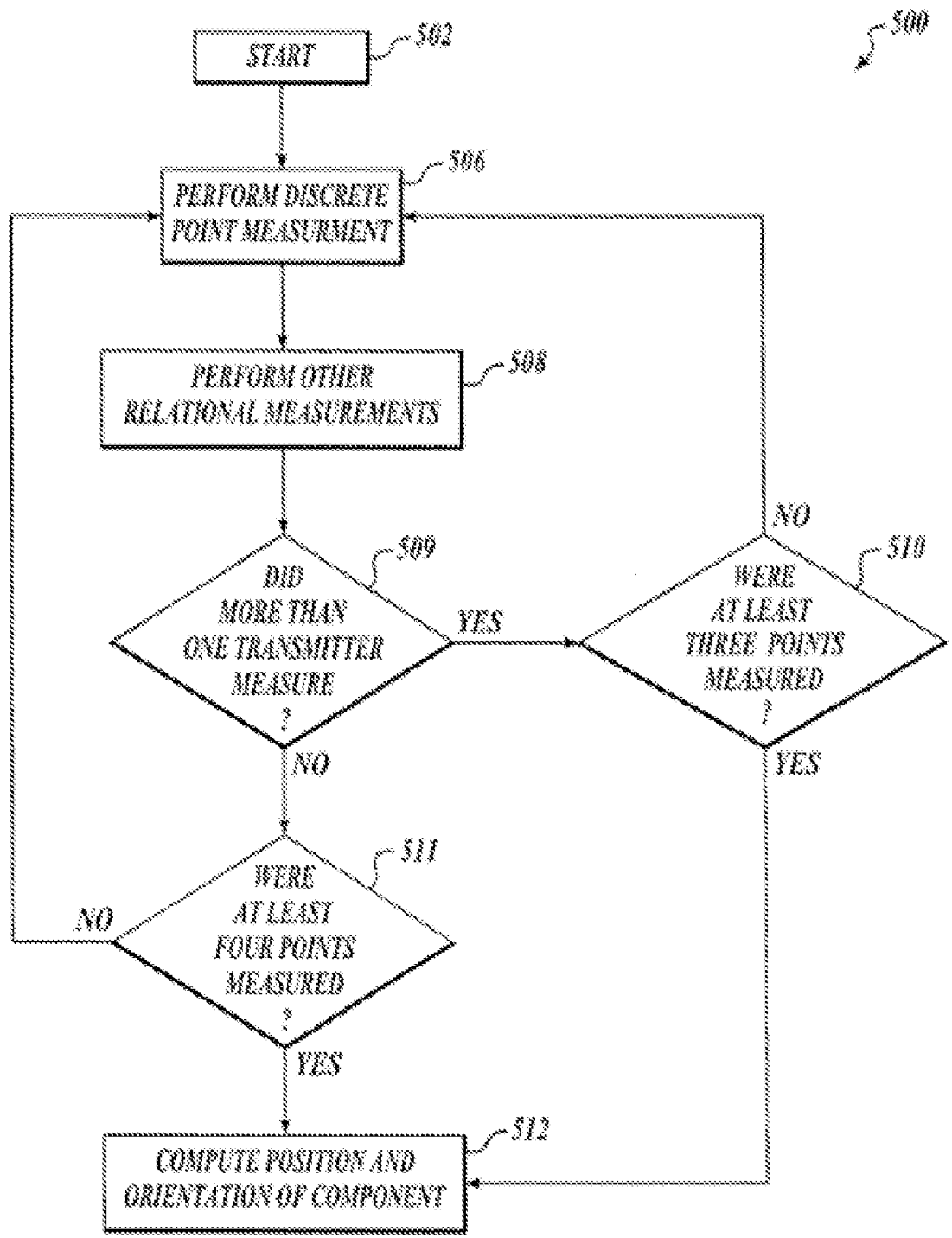
FIG. 3 is a flow chart of another method of performing a manufacturing operation in accordance with an alternate embodiment of the invention.

FIG. 3 is a flow chart of another method 500 of performing a manufacturing operation in accordance with an alternate embodiment of the invention. In this embodiment, the method 500 does not utilize historical data of a last known location of one of the components. Rather, the method utilizes four or more sensors and one transmitter, or two or more transmitters and three or more sensors to determine the positions of the first and second components. More specifically, as in the method 400 shown in FIG. 2, at a block 506, the position measurement system 110 is operated to perform measurements of the positions of at least three discrete points (or sensors 116) on at least one of the components 111 (i.e. a first component), and on another component 113 (i.e. a second component) that may be proximate thereto. At a block 508, any other desired relational measurements (e.g. gaps, edge margins, etc.) may be performed. At block 509 if more than one transmitter performed measurements, then at least three points are needed to locate the objects position and orientation (block 510). If only one transmitter measured then at least four points are needed to locate the objects position and orientation (block 511). Finally, at a block 512, the position and orientation of the component 111 is computed using the position measurements.

In yet another embodiment of the invention, the method can switch between the method described in FIG. 3 and the method described in FIG. 2 depending on the number of transmitters measuring, the number of points measured, and the availability of historical data. For example, as a tool first enters the manufacturing environment, no historical data is available to determine its location by the method of FIG. 2 and the method of FIG. 3 must be used to determine its location and orientation. However, as the tool moves through the manufacturing environment, historical data can be developed and the method of FIG. 2 can then be used to determine its position and orientation.

Figure 4:
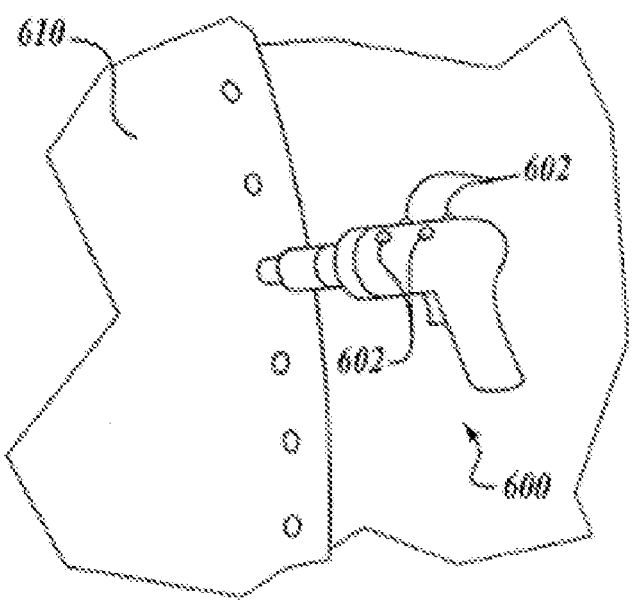
FIG. 4 is an isometric view of a drilling tool engaged with a workpiece during a manufacturing operation in accordance with an embodiment of the present invention.

As described above, embodiments of the present invention may be used to perform a variety of manufacturing operations, including the position control of tools which perform manufacturing operations on a workpiece, and the position control of first and second portions of a structure for attachment. For example, FIG. 4 is an isometric view of a drilling tool 600 engaged with a workpiece 610 during a manufacturing operation. A plurality of sensors 602 are positioned on the drilling tool 600. Thus, an embodiment of a method that uses position information from three sensors and historical information of a last known position (e.g. method 400 shown in FIG. 2) may be used to accurately position the drilling tool 600 with respect to the workpiece 610 to perform the desired manufacturing operation. Alternately, another embodiment of a method that uses position information from four sensors and no historical information of a last known position (e.g. method 500 shown in FIG. 3) may be used to perform the manufacturing operation.

Figure 5:
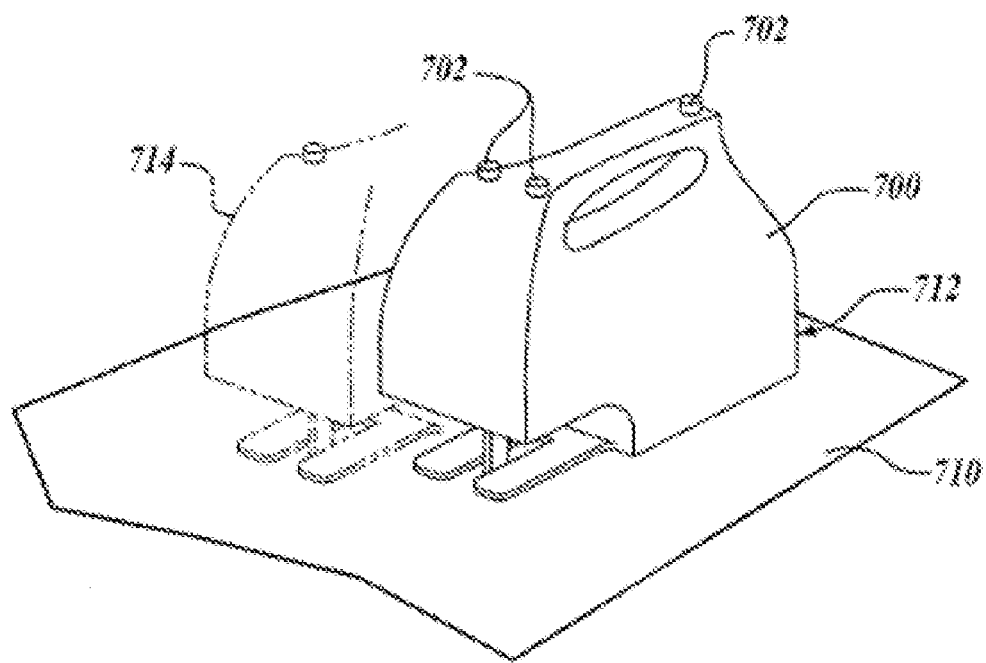
FIG. 5 is an isometric view of a cutting tool engaged with a workpiece during a manufacturing operation in accordance with another embodiment of the present invention.

Similarly, FIG. 5 is an isometric view of a cutting tool 700 having a plurality of sensors 702. The cutting tool 700 is engaged with a workpiece 710 during a manufacturing operation. As described above, embodiments of the invention may use position information from three sensors 702 and historical information of a last known position (e.g. method 400 shown in FIG. 2) may be used to determine the actual position 712 of the cutting tool 700 with respect to the workpiece 710 during the manufacturing operation, and the actual position 712 may be compared with a desired position 714, and appropriate corrections may be made as needed. Alternately, another embodiment that uses position information from four sensors and no historical information of a last known position (e.g. method 500 shown in FIG. 3) may be used to perform the manufacturing operation.

It will be appreciated that in alternate embodiments, embodiments of the invention may be used with a wide variety of tools, and that the invention is not limited to the particular tool embodiments described above or shown in the accompanying figures. For example, in alternate embodiments, manufacturing operations in accordance with the invention may be used with drills, cutting tools, riveters, mechanical and electromagnetic dent pullers, welders, wrenches, clamps, sanders, nailers, screw guns, or virtually any other type of manufacturing tools or measuring instruments.

Figure 7:
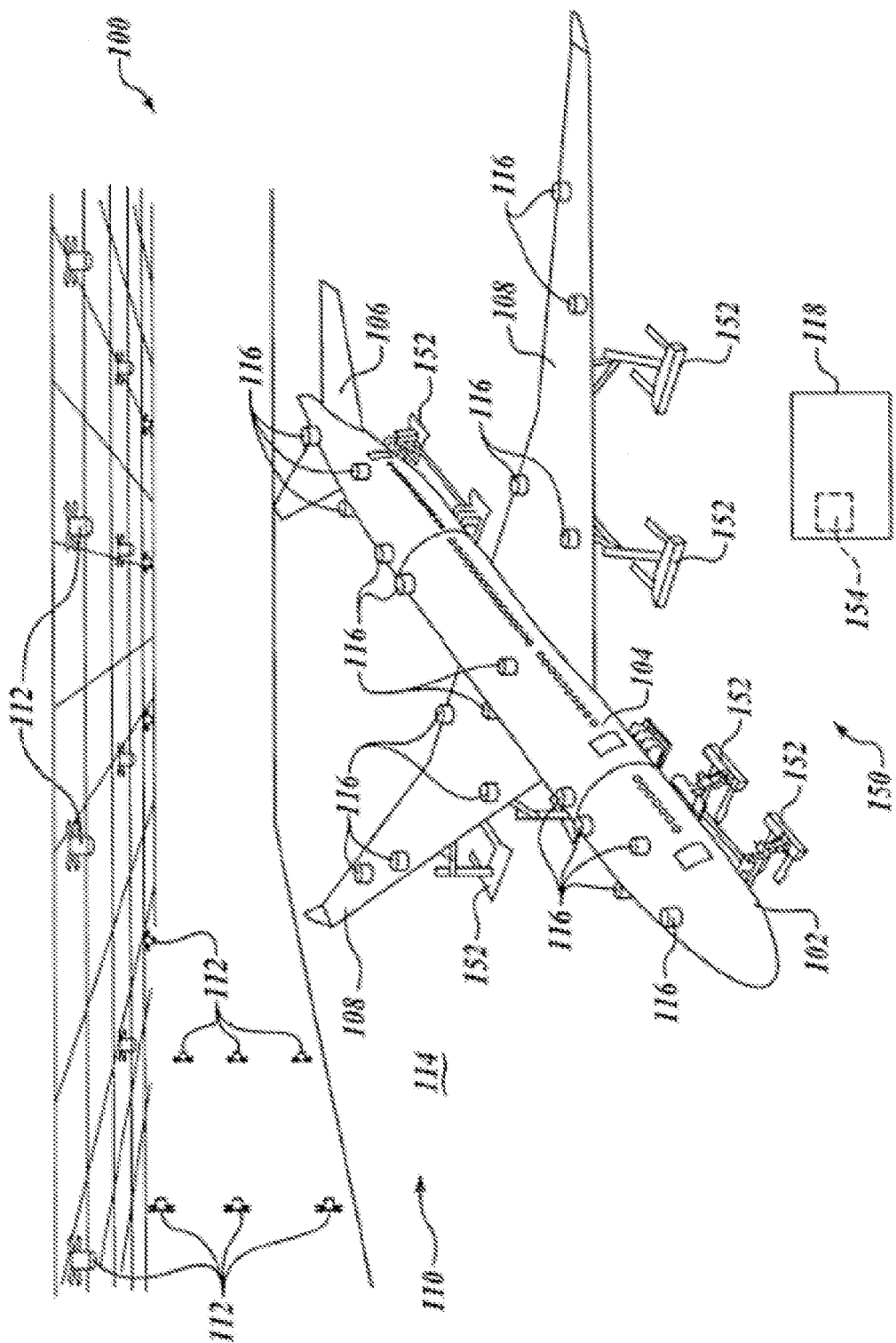
FIG. 7 is an isometric view of the aircraft components of FIG. 6 in an assembled position.

Furthermore, in alternate embodiments, the teachings of the invention may be used in manufacturing operations involving the relative positioning of two components, such as for attachment. For example, FIG. 6 is an isometric view of a plurality of disassembled aircraft components in a manufacturing facility 100 (e.g. a hangar, an assembly line building, etc.) in accordance with an embodiment of the invention. FIG. 7 is an isometric view of the aircraft components of FIG. 6 in an assembled position. As shown in FIG. 6, in this embodiment the aircraft components include a forward fuselage assembly 102, a mid-fuselage assembly 104, a tail fuselage assembly 106, and a pair of wing assemblies 108. The manufacturing facility 100, includes a position measurement system 110 having at least one transmitter 112 distributed about a work space 114, and a plurality of sensors 116 located on the surfaces of the various components 102, 104, 106, 108. The at least one transmitter 112 and the sensors 116 are operatively coupled to a data management computer 118 by wires, cables, or wireless coupling members (not shown for the sake of graphic clarity). A position control system 150 is provided to controllably move the components 102, 104, 106, 108 into their desired positions. In one representative embodiment, the position control system 150 includes a plurality of automated or semi-automated lifting devices 152 operatively coupled to a controller 154, wherein the lifting devices 152 are adapted to support and move the components in accordance with command signals from the controller 154.

It will be appreciated that embodiments of the present invention may operate more accurately with increasing rigidity of the components and workpieces upon which the desired manufacturing operations are being performed. Therefore, some embodiments of the invention may be better adapted for use with, for example, components which are rigid or approximately rigid, such that the distances between the sensors do not change significantly during the performance of the manufacturing operation. In specific embodiments, the components may be of sufficient rigidity such that the distances between the sensors do not change by more than the measurement uncertainty of the position measurement system.

In one embodiment, the position measurement system 110 may be a relatively-rapid data collection system that may be used to track positions of specific (or discrete) points of interest on or adjacent to one or more of the components 102, 104, 106, 108. A minimum criterion for locating the sensors 116 is that they move relative to the motion of the components 102, 104, 106, 108 to which they are applied. In addition, the relative distances between the at least three sensors 116 on each component 102, 104, 106, 108 must be known. An example of target placement is shown in FIG. 6, wherein the measurement system 110 could track three or more points (or sensors 116) on each upper surface of the wing assemblies 108, and three or more points (or sensors 116) on the mid-fuselage assembly 104 to which the wing assemblies 108 are to be attached. Thus, as described more fully below, the measurement system 110 could monitor the positions of both the wing assemblies 108 and the mid-fuselage 104 during the assembly process.

In some embodiments, the position measurement system 110 may be an infrared global positioning system (IRGPS), including those systems generally disclosed, for example, in U.S. Pat. No. 5,589,835 issued to Gildea et al., U.S. Pat. No. 6,452,668 B1, issued to Pratt, and U.S. Pat. Nos. 6,501,543 B2, 6,535,282 B2, 6,618,133 B2, and 6,630,993 B1 issued to Hedges et al., which patents are incorporated herein by reference. Such IRGPS systems are commercially-available from, for example, ArcSecond, Inc. of Dulles, Va. Alternately, the position measurement system 110 may be a laser-based point tracking system of the type commercially-available from Automated Precision, Inc. of Rockville Md., or any other suitable type of discrete point tracking system.

It will be appreciated that manufacturing facilities in accordance with the present invention may be utilized to assemble a wide variety of aircraft, and that the invention is not limited to the particular embodiment of manufacturing facility 100, or to the assembly of the particular aircraft embodiment shown in FIGS. 6 and 7. For example, while the aircraft shown in the accompanying figures is generally representative of a commercial passenger aircraft, including, for example, the 737, 747, 757, 767 and 777 models commercially-available from the Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft, published by Jane's Information Group of Coulsdon, Surrey, United Kingdom, which texts are incorporated herein by reference.

It will also be appreciated that manufacturing facilities having measurement systems in accordance with the teachings of the invention may be used to assemble a wide variety of other products. For example, embodiments of apparatus and methods in accordance with the invention may be employed in the manufacture of automobiles, recreational vehicles, ships, buildings, and virtually any other products that require the accurate assembly of components.

Of course, a variety of alternate embodiments of methods in accordance with the present invention can be conceived, and the invention is not limited to the particular embodiments described above and shown in FIGS. 1-4. For example, once the position and orientation of the first and second components have been computed, the information may be used to compare the computed position and orientation data to an "as designed" model of the aircraft, including an "as designed" position of one or more of the aircraft components 102, 104, 106, 108. Such a comparison could be conducted using a three-dimensional CAD aerodynamic model of the aircraft to provide the desired positions of the one or more components under consideration. Alternately, other methods known in the art may be employed to compare the position and orientation of any selected component as computed by method 400 to an ideal position for the component in the assembly process. If necessary to improve the fit of components, the component at issue may be moved and the method 400 rerun to compute the new location of the component. Alternately, the method 400 can be rerun simultaneously, with the movement of the component. In this way the component may be iteratively moved to its ideal position and orientation.

It will also be understood, that in alternate embodiments of methods in accordance with the invention, various combinations of discrete measurements using various numbers of transmitters 112 and sensors 116 may be performed. For example, in addition to the at least three discrete point measurements (sensors 116), the points having known relative distances to one another, a component 102, 104, 106, 108 may also have other sensors 116 which may or may not have known relative distances to one another. Moreover, more than one transmitter 112 in the line of sight of the at least three sensors 116 may be used in alternate embodiments. Or alternately, several transmitters 112 not in the line of sight with the at least three sensors 116 can be used with the above described method to take measurements of other discrete points on a component 102, 104, 106, 108. Moreover, some sensors 116 on a component may be in the line of sight of several transmitters 112. By using the distance between the transmitters 112 as part of the solution, all of the sensors 116 can be used to increase the data fidelity of the computed position and orientation of the component.

For embodiments of methods that include performing a measurement on only one of two components being coupled together (the position of the other component being assumed), it is preferred that the measurement be performed on the component that is believed to be the more critical component in terms of the necessary positioning accuracy. In one particular embodiment, for example, if a wing assembly 108 is being coupled with a mid-fuselage assembly 104, it may be preferable to measure the position and orientation of the wing assembly 108 and compare it with an aerodynamic model. Of course, in alternate embodiments, measurements may be made on both the mid-fuselage assembly 104 and the wing assembly 108, or on the mid-fuselage assembly 104 alone. Furthermore, it may be preferable that the measurements be performed at locations that may be directly compared with associated measurements on the design model in order for the comparisons with the design model to be accomplished without need for extrapolation or other actions that may degrade accuracy of the comparison.

It will also be understood that method 400 may be conducted simultaneously on several adjacent components 102, 104, 106, 108. Alternately, method 400 may be conducted sequentially on one component 102, 104, 106, 108, before being conducted on an adjacent component 102, 104, 106, 108.

Embodiments of methods and systems in accordance with the invention may advantageously improve the process of manufacturing large structures, including aircraft. The measurement system allows the components of the aircraft to be aligned, and aerodynamic conformity to be verified, while aircraft assembly is taking place. Furthermore, embodiments of the present invention may advantageously reduce by 50% the number of transmitters 112 needed to get an accurate measurement of the position of a component. Moreover, embodiments of the current invention advantageously allow for the computation of the position and orientation of a component using only one transmitter 112 and three sensors 116. With such data, motion control feedback can be provided to an automated position control system to align and join aircraft components together. Furthermore, the discrete point data of the "as-built" component may be compared with the "as-designed" model of the aircraft, and the "as-built" component may be moved throughout any of six degrees of freedom (i.e. x-y-z translated, pitched, rolled, yawed) to provide a "best fit" between the "as built" component and the "as designed" model. Thus the resulting assembled aircraft may be more accurately assembled, and may provide improved aerodynamic performance, in comparison with aircraft assembled in accordance with prior art assembly processes.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of performing a manufacturing operation, comprising:
    measuring at least three discrete point positions associated with a first component by using at least one transmitter having a known position and orientation and in a line of sight with the at least three discrete point positions, the at least three discrete point positions having known distances relative to one another;
    assuming no sudden position changes of the first component since the first component moved from a last known location;
    computing a current position and orientation of the first component using the measured data provided by the at least one transmitter and the known relative distances between the at least three point positions, along with position and orientation data from the last known location; and
    performing the manufacturing operation using the computed current position and orientation of the first component.

2. The method of claim 1, wherein measuring at least 3 discrete point positions associated with the first component by using at least one transmitter includes measuring additional discrete point positions associated with the first component apart from the at least 3 discrete point positions, and further wherein computing the current position and orientation of the first component includes using data measured from the additional discrete point positions.

3. The method of claim 1, wherein measuring at least three discrete point positions associated with the first component includes measuring a discrete point position using at least one of a global positioning system, an infrared global positioning system, and a laser-based point tracking system.

4. The method of claim 1, further comprising:
    measuring at least three discrete point positions associated with a second component by using at least one transmitter having a known position and orientation and in a second line of sight with the at least three discrete point positions, the at least three discrete point positions having known distances relative to one another;
    assuming no sudden position changes since the second component has moved from a second last known location;
    computing a current position and orientation of the second component using the measured data provided by the at least one transmitter and the known relative distances between the at least three discrete point positions, along with position and orientation data from the second last known location;
    comparing the computed position and orientation associated with at least one of the first and second components with a desired position; and
    moving at least one of the first and second components to bring them closer to the desired position.

5. The method of claim 4, wherein the first component comprises a workpiece and the second component includes a tool adapted to perform an operation on the workpiece.

6. The method of claim 4, wherein the first component comprises a first portion of a structure and the second component comprises a second portion of the structure, and wherein moving at least one of the first and second components comprises moving at least one of the first and second components to prepare for attaching the first and second portions.

7. The method of claim 4, wherein measuring at least three discrete point positions associated with a second component includes measuring additional discrete point positions associated with the second component apart from the at least three discrete point positions, and further wherein computing the current position and orientation of the second component includes using data measured from the additional discrete point positions.

8. The method of claim 4, wherein measuring at least three discrete point positions associated with the first component and measuring at least three discrete point positions associated with the second component includes simultaneously measuring the at least three discrete point positions associated with the first component and the at least three discrete point positions associated with the second component.

9. The method of claim 4, wherein measuring at least three discrete point positions associated with the first component and measuring at least three discrete point positions associated with a second component includes using at least one of a global positioning system, an infrared global positioning system, and a laser-based point tracking system.

10. A system for positioning first and second components for performing a manufacturing operation, comprising:
    a measurement system comprising a first transmitter adapted to measure at least three discrete point positions associated with at least one of the first and second components, the at least three discrete point positions having known relative distances to one another, and the at least three discrete point positions being at least one of on and adjacent to the corresponding one of the first and second components; and
    a data management device operatively coupled to the measurement system, the data management device including a processor portion, and at least one of software and instructions which, when executed, allow the data management device to:
        receive the measured positions of the at least three discrete point positions,
        compute the position and orientation of the at least one of the first and second components using the measured positions of the at least three discrete points on the at least one of the first and second components and the known relative distances between the at least three discrete point positions and auxiliary data and assuming no sudden position changes by the at least one of the first and second component, wherein the auxiliary data in the data management device includes a position and orientation of the at least one of the first and second component at a last known location; and perform the manufacturing operation using the computed position and orientation of the at least one of the first and second components.

11. The system of claim 10, wherein the measurement system includes at least one of a global positioning system, an infrared global positioning system, and a laser-based point tracking system.

12. The system of claim 10, further comprising a second transmitter with a known position and orientation, the second transmitter being adapted to conduct measurements of additional discrete point positions on at least one of the first and second components, and further wherein the data management system is adapted to utilize the measurements made by the second transmitter in computing the position and orientation of the at least one of the first and second components.

13. The system of claim 10, wherein the measurement system comprising a first transmitter adapted to measure at least three discrete point positions associated with at least one of the first and second components is further adapted to re-measure the at least three discrete point positions during a movement of the at least one of the first and second components.

14. The system of claim 10, wherein the measurement system is further adapted to measure other discrete points apart from the at least three discrete points on at least one of the first and second components, the other discrete points not having distances known relative to the at least three discrete points, the measurement system being adapted to use the data from the other discrete points to improve data fidelity of the computed position and orientation of at least one of the first and second components.

* * * * *